(12) United States Patent
Ilyushenko et al.

(10) Patent No.: US 7,740,162 B2
(45) Date of Patent: Jun. 22, 2010

(54) WELDING METHOD

(75) Inventors: Rostyslav Ilyushenko, Bristol (GB); Robert Jan Maziarz, Bristol (GB); Huw Davies, Malmesbury (GB)

(73) Assignee: Airbus UK, Limited, Filton, Bristol (GB)

( * ) Notice: Subject to any disclaimer, the term of this patent is extended or adjusted under 35 U.S.C. 154(b) by 0 days.

(21) Appl. No.: 10/533,177

(22) PCT Filed: Oct. 28, 2003

(86) PCT No.: PCT/GB03/04646

§ 371 (c)(1),
(2), (4) Date: Apr. 29, 2005

(87) PCT Pub. No.: WO2004/039527

PCT Pub. Date: May 13, 2004

(65) Prior Publication Data

US 2006/0013645 A1 Jan. 19, 2006

(30) Foreign Application Priority Data

Nov. 1, 2002 (GB) .................................... 0225518

(51) Int. Cl.
*B23K 20/12* (2006.01)
(52) U.S. Cl. ..................... 228/112.1; 228/2.1
(58) Field of Classification Search ............. 228/2.1, 228/112.1; 156/73.5, 580; 428/615, 594, 428/598; 148/671, 564
See application file for complete search history.

(56) References Cited

U.S. PATENT DOCUMENTS 4,503,314 A 3/1985 Kakami et al.
4,830,265 A * 5/1989 Kennedy et al. ............ 228/203

(Continued)

FOREIGN PATENT DOCUMENTS

DE 199 57 136 C1 2/2001

(Continued)

OTHER PUBLICATIONS

Hermann et al., "Liquation cracking in aluminum alloy welds," *Materials Science & Engineering*, A212, pp. 247-255 (1996).

(Continued)

*Primary Examiner*—Roy King
*Assistant Examiner*—Michael Aboagye
(74) *Attorney, Agent, or Firm*—Patterson Thuente Christensen Pedersen, P.A.

(57) ABSTRACT

Two aluminium alloy work-pieces are welded together. Firstly, a portion (2) of each work-piece (1) is prepared, the preparation including the performance of a surface treatment, such as friction stir welding, that results in a region (A) extending from the exterior surface into the work-piece having a grain structure that is finer than the grain structure of the work-piece outside (region C) that region. Then the work-pieces are welded together by means of a fusion welding process, such as electron beam welding, that joins the respective prepared portions (2) of the two work-pieces (1). The preparation of the work-pieces is so performed that said region (A) extends into the work-piece to a depth that exceeds the depth of material (region D) that is caused to melt during the fusion welding process.

16 Claims, 9 Drawing Sheets

U.S. PATENT DOCUMENTS

| | | | |
|---|---|---|---|
| 5,211,910 A | | 5/1993 | Pickens et al. |
| 5,460,317 A | | 10/1995 | Thomas et al. |
| 5,720,824 A | * | 2/1998 | Bronson et al. ............ 134/3 |
| 5,813,592 A | | 9/1998 | Midling et al. |
| 6,045,028 A | | 4/2000 | Martin et al. |
| 6,050,475 A | | 4/2000 | Kinton et al. |
| 6,051,325 A | * | 4/2000 | Talwar et al. ............ 428/593 |
| 6,098,808 A | * | 8/2000 | Matsuda et al. ............ 206/708 |
| 6,168,067 B1 | * | 1/2001 | Waldron et al. ............ 228/112.1 |
| 6,219,916 B1 | * | 4/2001 | Walker et al. ............ 29/889.21 |
| 6,227,430 B1 | | 5/2001 | Rosen et al. |
| 6,398,883 B1 | * | 6/2002 | Forrest et al. ............ 148/516 |
| 6,659,330 B2 | * | 12/2003 | Ezumi et al. ............ 228/112.1 |
| 6,712,916 B2 | * | 3/2004 | Mishra et al. ............ 148/564 |
| 6,726,085 B2 | * | 4/2004 | Litwinski et al. ............ 228/112.1 |
| 6,742,697 B2 | * | 6/2004 | McTernan et al. ............ 228/112.1 |
| 6,777,106 B2 | * | 8/2004 | Catteau et al. ............ 428/615 |
| 6,799,708 B2 | | 10/2004 | von Strombeck et al. |
| 7,122,761 B2 | * | 10/2006 | Ditzel et al. ............ 219/121.64 |
| 2002/0158109 A1 | * | 10/2002 | Gendoh et al. ............ 228/112.1 |
| 2003/0218052 A2 | | 11/2003 | Litwinski |

FOREIGN PATENT DOCUMENTS

| | | |
|---|---|---|
| EP | 0 615 480 B1 | 9/1994 |
| EP | 0 810 054 A1 | 12/1997 |
| EP | 0 810 055 A1 | 12/1997 |
| EP | 1 162 283 A2 | 12/2001 |
| JP | 52 131943 A | 11/1977 |
| JP | 57181775 | 11/1982 |
| JP | 2001150155 * | 5/2001 |
| JP | 2001-234308 | 8/2001 |
| JP | 2002-249860 | 9/2002 |
| WO | WO 93/10935 | 6/1993 |
| WO | WO9310935 * | 6/1993 |
| WO | WO 95/26254 | 10/1995 |
| WO | WO 01/83153 A1 | 11/2001 |

OTHER PUBLICATIONS

Lu et al., "Simulation of microstructure and liquation cracking in 7017 Aluminum alloy," *Materials Science & Engineering*, A220, pp. 1-7 (1996).

Saito et al., "Grain refinement of 1050 aluminum alloy by friction stir Processing," *J. Materials Science Letters*, vol. 20, pp. 1913-1915 (2001).

Dvornak et al., "The Weldability and Grain Refinement of Al-2.2Li-2.7Cu," *Welding Journal*, vol. 68, No. 8, pp. 327-s—335-s (1989).

Bartle, P.M., "Heat-affected zone embrittlement in aluminium-zinc-magnesium alloys", pp. 24-46 (1970).

\* cited by examiner

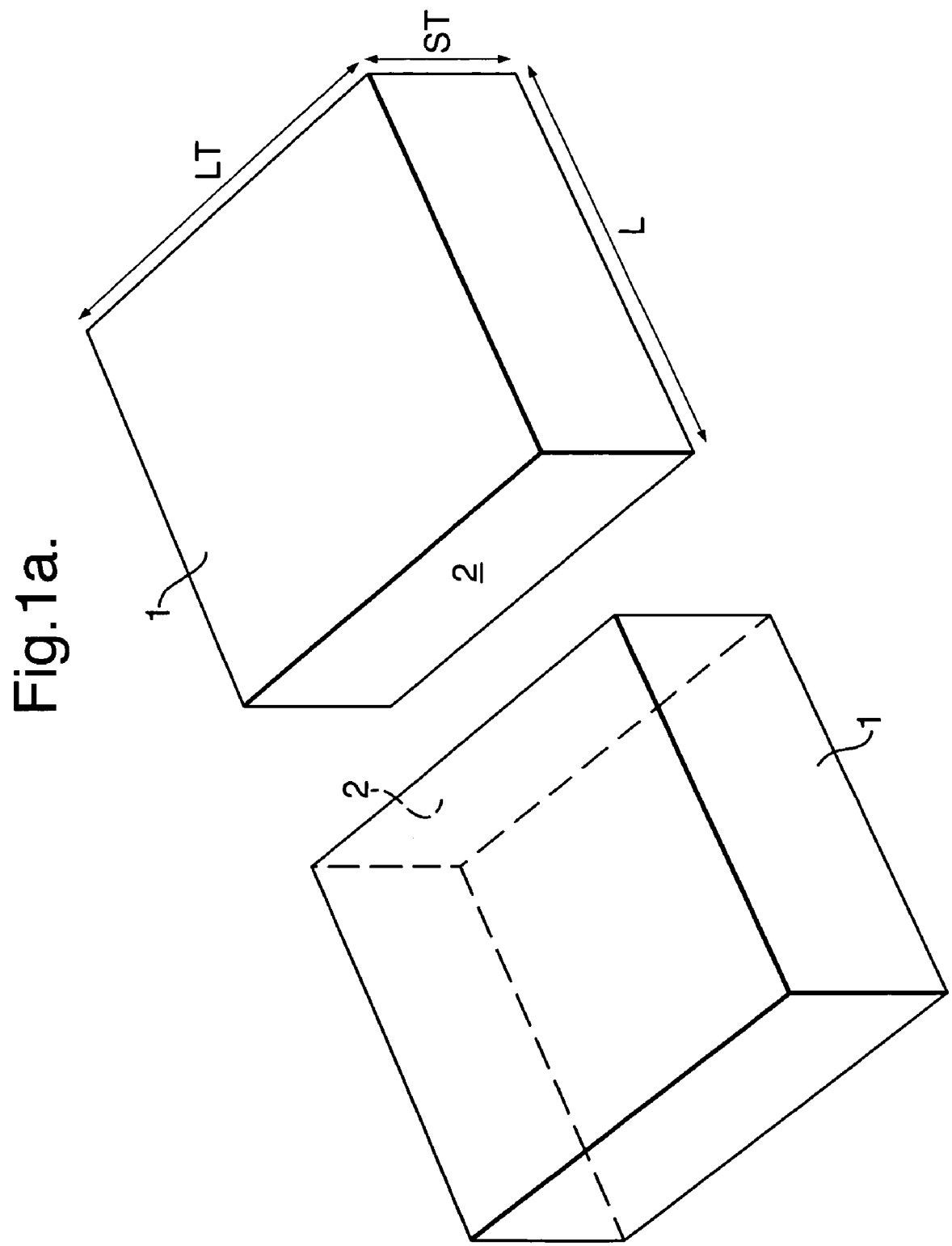

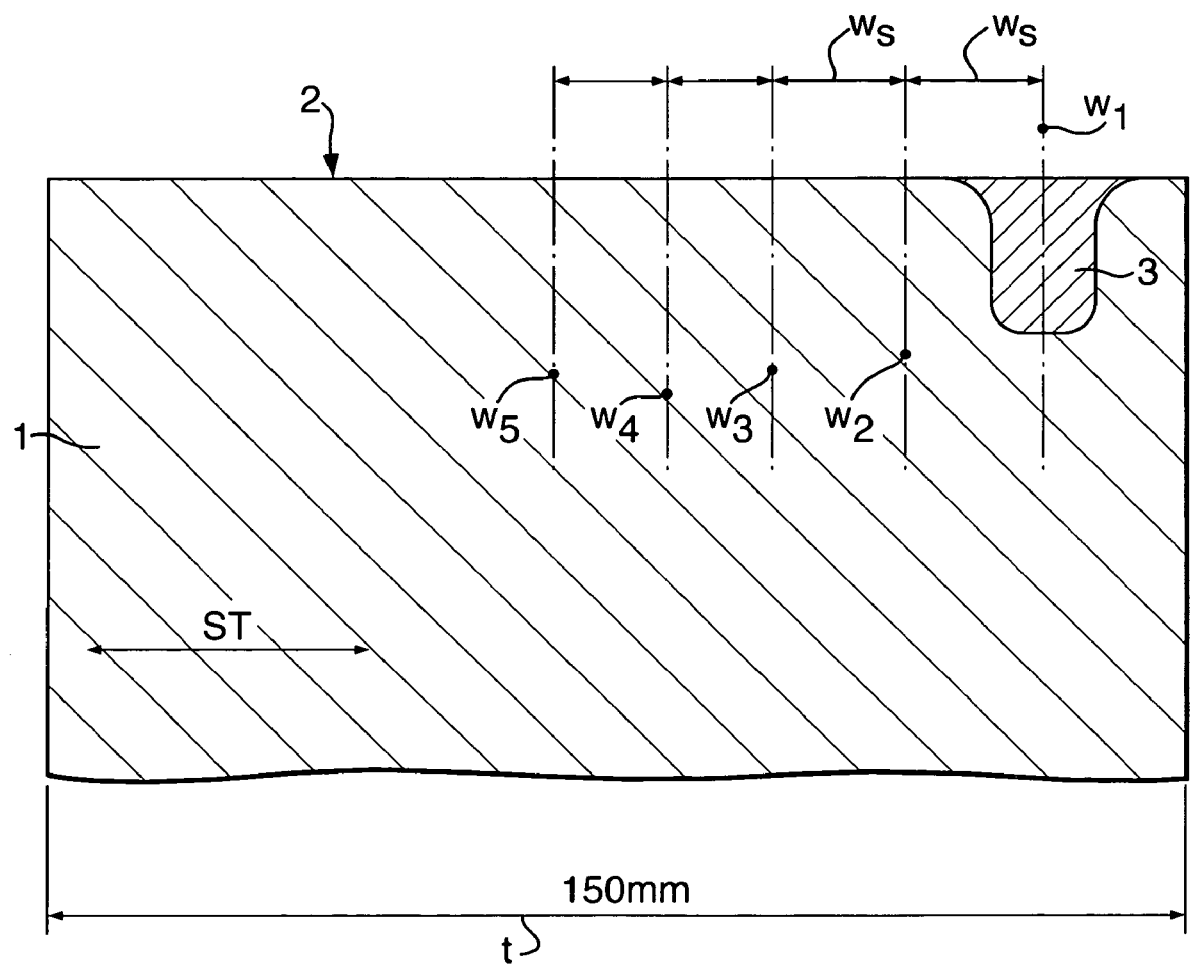

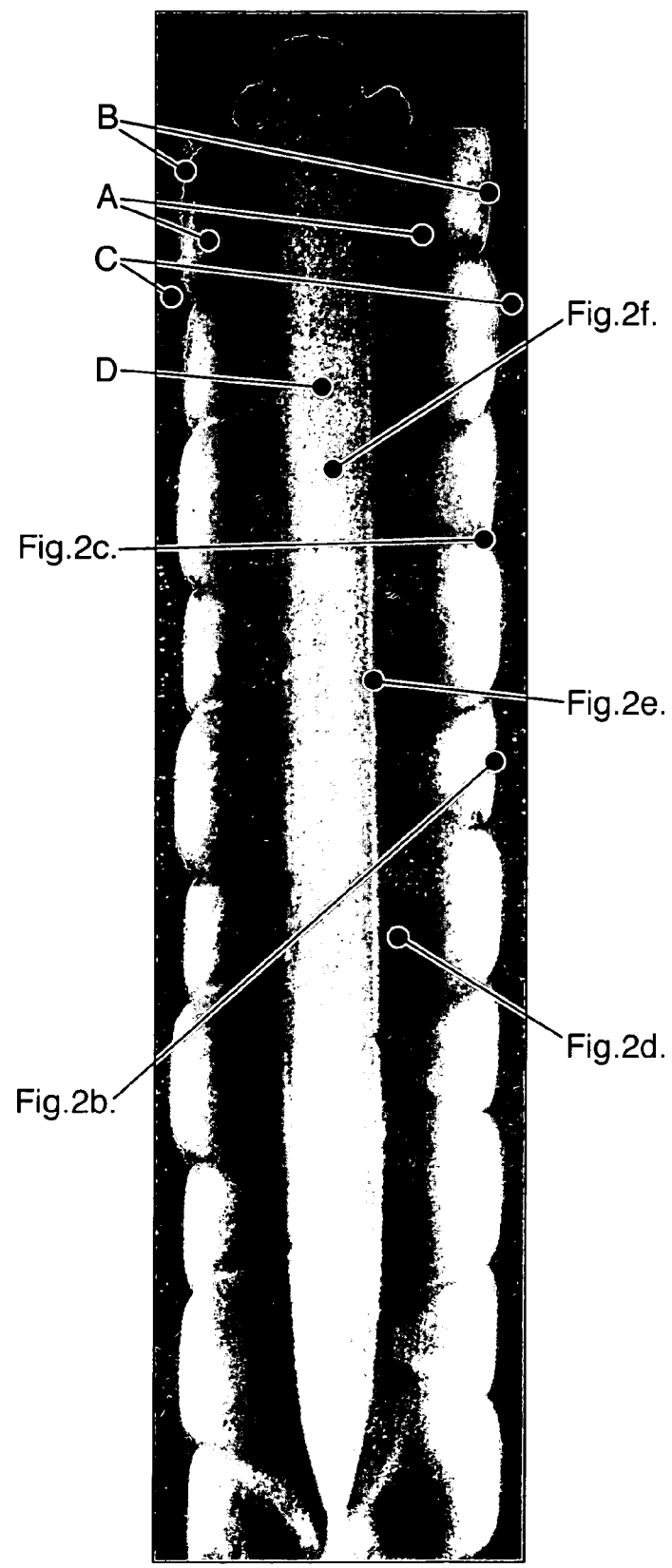

WELDING METHOD

BACKGROUND OF THE INVENTION (1) Field of the Invention

The present invention relates to welding two metal work-pieces together and relates in particular, but not exclusively, to welding together two relatively thick work-pieces made from metal alloys that have been prepared for use in the manufacture of aircraft components.

(2) Description of Related Art

When manufacturing aircraft components it is sometimes necessary or desirable to weld together thick work-pieces for example solid blocks of aluminium alloy having a thickness of 50 mm or greater. The alloy will typically be an aluminium alloy that has been treated so that it has certain mechanical properties necessary for the alloy to be suitable for use in the manufacture of aircraft components. As a result, the microstructure of the alloy is formed of relatively coarse elongate grains that are generally oriented parallel to each other. Welding blocks of aluminium of such a thickness is generally performed by means of a fusion welding process such as an electron beam (EB) welding process. It is common when joining blocks of aluminium in this way for cracks to form (for example micro-cracks) in or near the region of the weld. Such cracks weaken the welded component particularly under fatigue loading.

SUMMARY OF THE INVENTION

It is an object of the present invention to produce a method of welding two work-pieces together that eliminates or reduces the formation of cracks during the welding process as compared to the known prior art method described above.

According to the present invention there is provided a method of welding together two metal work-pieces, the method including the following steps:

providing two metal work-pieces, preparing a portion of each work-piece, the preparation including the performance of a surface treatment that results in a region extending from the exterior surface into the work-piece having a grain structure that is finer than the grain structure of the work-piece outside that region, and welding together the work-pieces by means of a fusion welding process that joins the respective prepared portions of the two work-pieces, wherein said region extends into the work-piece to a depth that exceeds the depth of material that is caused to melt during the fusion welding process.

It has been found that the treating of the metal in the region of the weld joint to be formed mitigates the problems associated with the formation of cracks. It has been observed that the formation of at least some cracks in the methods of the prior art tends to occur in the work-piece near the interface between the alloy and the weld, in regions where there has been partial liquefaction of the alloy due to the heat generated when welding. Such cracks are often referred to as liquation cracks and commonly occur at the boundary between adjacent grains in the alloy. It is thought that such cracks result from the formation of grain boundary liquid (at temperatures below the melting point of the grains of the alloy), which, being unable to support the tensile stresses that are developed as a result of the temperature changes during and after welding, leads to cracks forming along the grain boundary.

The average maximum dimension of the grains in the work-piece outside the region that has been subjected to said surface treatment is preferably at least five times greater than the average maximum dimension of the grains in the work-piece inside the region. Alternatively or additionally, the method is performed such that there is at least one cross-section in which the difference between the grain size number of the material in the work-piece outside the region that has been subjected to said surface treatment and the grain size number of the material in the work-piece inside the region is greater than or equal to 4. The grain size number, G, of a material is defined by the equation $n=2^{G-1}$, where n=the number of grains per square inch at 100× magnification (i.e. the number of grains in an area of $0.0645$ mm$^2$).

The preparation of the work-pieces may, if necessary, include a step of treating or machining the surface treated regions of each work-piece to produce a surface on one work-piece that can be fusion welded to a corresponding surface on the other work-piece. The regions subjected to said surface treatment may for example be skimmed to produce substantially flat surfaces. The skimming of the work-pieces may for example be performed by a milling machine. The skimming may typically remove a layer of material from a face of the work-piece that, had the work-piece not been subjected to said surface treatment, would have been about 0.5 mm thick. The depth of material removed during skimming will of course depend on the amount of material that needs to be removed in order to provide a flat surface, which will of course depend on the surface treatment employed.

The surface treatment of the metal is preferably performed within a region that encompasses the region that will liquefy during the fusion welding process. The region that will liquefy may for example at the lowest be about 2 mm, and may be as high as 5 mm (or even higher depending on the fusion welding method employed), to either side of the weld joint. In the case where the depth of liquefaction during fusion welding is 2 mm to either side of the joint, the surface treating of the metal beforehand must extend beyond that depth, for example to a depth of at least 5 mm. In the case where the surface of the work-piece is skimmed between the steps of surface treatment and fusion welding, then the depth of the material that has been subjected to said surface treatment will of course be reduced. The surface treatment may be conducted to a depth of at least 10 mm. The surface treatment may be conducted to a depth of less than 100 mm. The surface treatment may for example be conducted to a depth of between 5 mm and 40 mm and more preferably to a depth of between 10 mm and 30 mm. It will of course be understood that the surface treatment is referred to as such only because the treatment is effected near the surface of the work-piece and that the term is not limited to treatments where the treatment affects only the surface properties of the work-piece.

It will be appreciated that, depending on the depth to which the metal is subjected to said surface treatment, the fusion welding process may generate a heat affected zone (i.e. a zone in which the mechanical properties of the metal/alloy, such as for example hardness, are altered by the heat generated during welding) that extends beyond the boundary of the metal that has been subjected to said surface treatment.

The surface treatment is preferably so performed that the temperature of the metal does not reach the melting temperature of the metal work-piece. Advantageously, the surface treatment is performed such that the temperature of the metal does not exceed the eutectic phase melting temperature. Preferably, the surface treatment is performed such that the temperature of the metal does not exceed the liquation temperature of the metal in the grain boundaries.

Advantageously, the performance of the surface treatment causes plasticization of the metal, but preferably causes substantially no liquefaction or fluidization. Preferably, the surface treatment causes substantially no melting of the metal.

Advantageously, the surface treatment is performed by means of a friction stir welding process. Such a process is described in U.S. Pat. No. 5,460,317 (Thomas et al), U.S. Pat. No. 5,813,592 (Midling et al), WO 93/10935 (The Welding Institute), and WO 95/26254 (Norsk Hydro A. S.), the specifications of which are hereby fully incorporated herein by reference thereto. The friction stir welding process may be in the form of a process as described in any of those references. It will be understood that the term "friction stir welding" encompasses any method of welding in which a probe of material harder than the work-piece material is caused to move relative to the work-piece to generate frictional heat causing the work-piece in the region of the probe to become plasticised, the probe effectively entering the work-piece. The probe is conventionally caused to rotate about the probe axis and to move along the work-piece along the length of the weld to be formed.

The fusion welding process is conveniently performed by means of an electron beam welding process. Other fusion welding processes could be utilised but, of the methods currently available, electron beam welding is preferred because of the depth of weld achievable at relatively low weld widths.

The work-pieces may be made from low-density alloys. For example, the density of the metal is preferably less than 5,000 Kgm$^{-3}$, more preferably less than 4,000 Kgm$^{-3}$, and yet more preferably less than 3,000 Kgm$^{-3}$. The work-pieces are preferably made from lightweight alloys. The work-pieces may be made from aluminium alloys. The work-pieces may be made from cold-worked metal. The cold-worked metal may for example have been subjected to a rolling process. The method is of particular application in the case where the work-pieces are suitable for use in the manufacture of an aircraft or aerospace component. For example, the metal may be any conventional or suitable alloy used in the aerospace industry, such as 2000 series, 6000 series, 7000 series aluminium alloys, or aluminium-lithium alloys. Such alloys have in the past been viewed as being difficult to weld together satisfactorily, especially where the depth of the joint to be welded is greater than or equal to about 50 mm. Such alloys may be difficult to weld satisfactorily due to one or more of several factors including a) the complexity of the alloying system, b) the particular heat treatment(s) to which the alloy has previously been subjected, c) the mechanical/chemical structure/composition of the material, d) the particular arrangement of different phases in the alloy or of precipitates formed in the alloy and/or e) the size and/or orientation of the grains of the alloy material.

The two work-pieces may, but need not be, of the same type of material. The method of the present invention is for example advantageously able to be used to weld together different metals or alloys. For example, the method of the present invention could be utilised when manufacturing a component, one part of which being required to have one set of mechanical/physical properties and another part of the component being required to have a different set of mechanical/physical properties.

The method may of course be performed to weld together one or more other work-pieces, possibly welding the multiplicity of work-pieces together simultaneously or possibly welding the multiplicity of work-pieces together in series (sequentially).

The work-pieces may be in the form of blocks of material. The blocks of material after having been welded together may for example be machined into a component. The present invention thus also provides a method of manufacturing a component, for example an aircraft component, wherein the component is machined from a block of metal, the block of metal having been made from two or more work-pieces welded together in accordance with the method according to the present invention as described above. The block or blocks may conveniently, but not necessarily, be cuboid in shape. The size and shape of the work-pieces to be welded together may be, and possibly need only be, limited by the limitations of the fusion welding process employed. For example, it is possible to weld with a 120 kW (120 kV operating at up to 1000 mA) electron beam welding apparatus to depths of up to 450 mm. With such an apparatus it would be possible to weld together two work-pieces having a thickness of 450 mm by means of a single pass electron beam weld. If a dual pass (i.e. one welding pass on each side of the joint to be welded) electron beam weld process is utilised, the thickness of work-pieces able to be joined could be as high as 900 mm. Greater thicknesses of material could be welded together with more powerful fusion welding equipment. Whilst a dual pass electron beam welding process is possible, a single pass process is preferred, because of the potential difficulties in ensuring a high quality weld joint in the region where the two electron beam welds interface.

It will be appreciated that the work-pieces may be trimmed and/or machined after performance of the method of the present invention and that therefore the integrity of the weld joint in the regions of the work-piece that are subsequently removed is not important. There may also be other regions where the integrity of the joint between the work-pieces is not important for other reasons. For example, the work-pieces once joined might be machined into a component that in use is subjected to forces/stresses such that the strength of weld joint required varies across the joint. In such cases, the portions of the respective work-pieces being welded together in accordance with the present invention may actually be contained within larger regions that have been subjected to a surface treatment, or similarly prepared.

According to another aspect of the invention there is provided a method of manufacturing an aircraft component including the following steps:

providing two metal work-pieces, preparing a portion of each work-piece, the preparation including the performance of a surface treatment that results in a region extending from the exterior surface into the work-piece having a grain structure that is finer than the grain structure of the work-piece outside that region, and welding together the work-pieces by means of a fusion welding process that joins the respective prepared portions of the two work-pieces, wherein said region extends into the work-piece to a depth that exceeds the depth of material that is caused to melt during the fusion welding process.

According to a further aspect of the invention there is provided a method of welding together two metal work-pieces, the work-pieces being made from a lightweight alloy suitable for use in the manufacture of an aircraft component, the method including the following steps:

providing two metal work-pieces, preparing a portion of each work-piece, the preparation including the performance of a surface treatment that results in a region extending from the exterior surface into the work-piece having a grain structure that is finer than the grain structure of the work-piece outside that region, and welding together the work-pieces by means of a fusion welding process that joins the respective prepared portions of the two work-pieces, wherein said region extends into the work-piece to a depth that exceeds the depth of material that is caused to melt during the fusion welding process. The present invention also provides a component made from two work-pieces welded together in accordance with the method of the present invention as described herein. The component may be in the form of an aerospace component, an aircraft component or any other component that is required to have similar alloy material properties. The component may for example be in the form of a spar for an aircraft wing box. The spar may be over 10 metres long. The billets of the alloy that are supplied to the aircraft manufacturer may have a maximum dimension of 5 metres. Such a spar may be manufactured from those billets by welding a plurality, three for example, billets end to end by means of the method of the present invention and then machining the spar from the resulting block.

The invention further provides a component comprising a weld joint joining one part of the component to an adjacent part of the component, the component in the region of the joint comprising a portion, that has been fusion welded, sandwiched between two portions that have each been friction stir welded. The component may be in the form of an aerospace component, an aircraft component or any other similar component.

It will be appreciated that features described with reference to one aspect of the invention may be incorporated into other aspects of the invention. For example, the component, for example an aircraft component, according to the present invention may be made by means of the method of the present invention.

It will be appreciated that a component formed by means of the present invention may require further processing before assembly. The component may therefore, in certain circumstances, be considered as an intermediate, requiring further processing before being considered as a finished article. For example, the component may require further machining, treating, assembly with other parts, or any other such processes. It will therefore be understood that the term component is used herein both to cover the case where the component is in a state ready for final assembly and the case where the component is at an earlier stage in the component's manufacture.

According to a preferred aspect of the invention there is also provided a method of welding together two work-pieces, the method including the following steps:

providing two metal work-pieces,
friction stir welding a region of each work-piece,
preparing the friction stir welded regions of each work-piece to produce a surface on one work-piece that can be fusion welded to a corresponding surface on the other work-piece, and
fusion welding the respective prepared surfaces of the two work-pieces together, thereby joining the work-pieces.

DESCRIPTION OF THE DRAWINGS

Embodiments of the present invention will now be described by way of example only with reference to the accompanying drawings, of which:

FIG. 1a illustrates schematically the welding together of two metal plates according to a first embodiment of the invention;

FIG. 1c shows a cross-section of the portion of the plate shown in FIG. 1b;

FIG. 2a shows a cross-section of the final welded joint formed by means of the first embodiment;

FIGS. 2b to 2f show magnified portions of FIG. 2a;

DETAILED DESCRIPTION

Figure 1B:
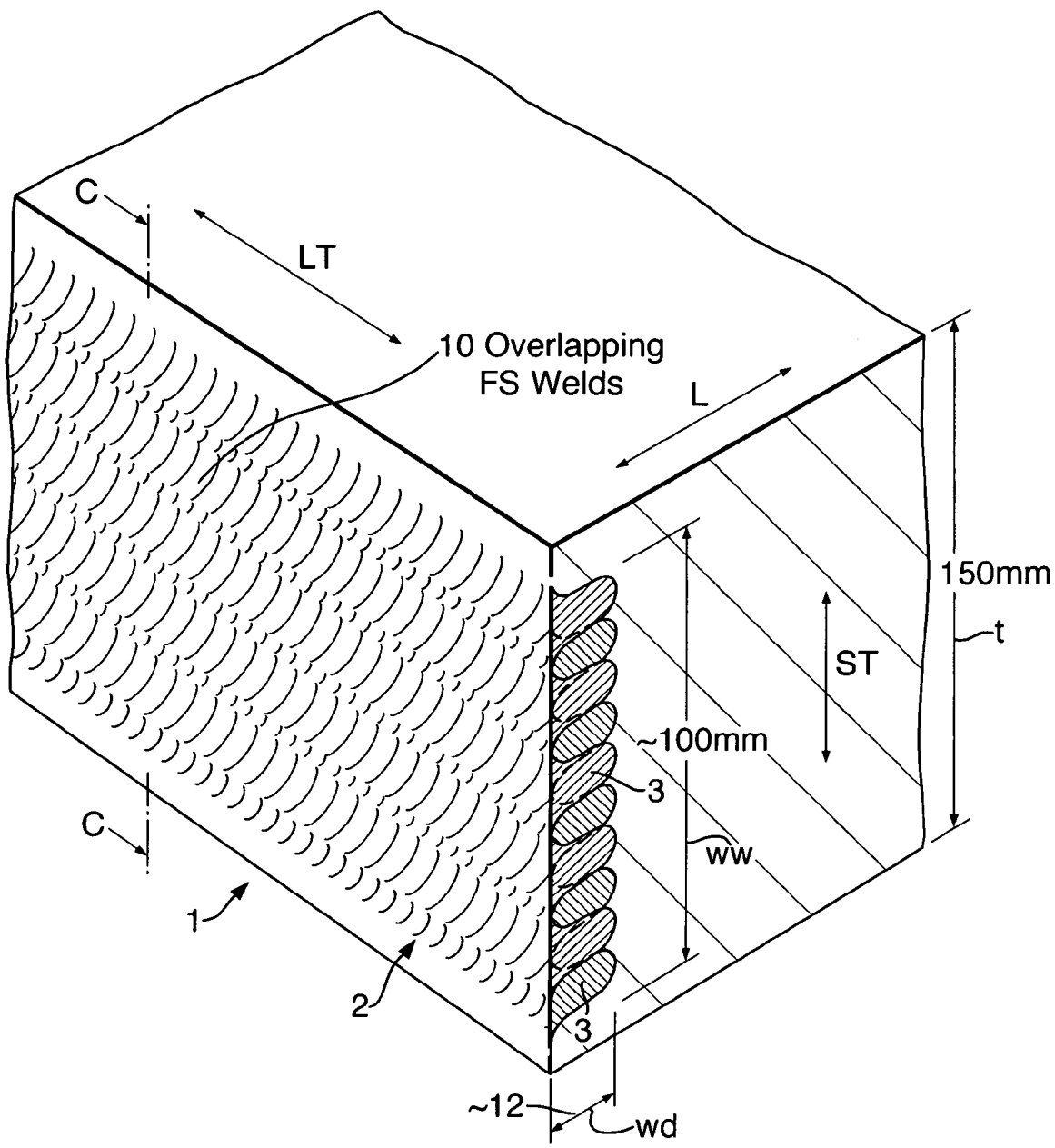
FIG. 1b shows a portion of one of the plates shown in FIG. 1a during a friction stir welding process.

The first embodiment of the invention relates to an experiment in which two rolled plates were welded together. The rolled plates 1 before being joined are illustrated schematically in FIG. 1a. The plates were made by rolling in the longitudinal direction of the plates (represented by arrow L in the drawings). The direction of the width of the plate is represented by arrow LT (i.e. the Long Transverse direction). The direction of the thickness of the plate is represented by arrow ST (i.e. the Short Transverse direction). The rolled plates 1 have a thickness t (in direction ST) of 150 mm. The plate was made from a 7000 series aluminium alloy in T7651 temper condition. The alloy used comprises Aluminium, Zinc, Copper and Magnesium. The alloy had a relative high content of zinc (>6 wt. %). This alloy was chosen because of the known difficulties associated with fusion welding the alloy.

The microstructure of the respective sides 2 of the plates 1 to be joined was modified using a friction stir welding process. The tool used in friction stir welding process had a 30 mm shoulder diameter and a pin having a length of 12.05 mm. The pin used has a cross-section that tapers (the cross-section becomes progressively smaller) along its length, the angle of the taper being 10 degrees, from a diameter of 14 mm at its widest at the top of the pin (immediately beneath the shoulder). Ten overlapping bead-on-plate weld runs were performed in the LT (Long Transverse) direction on the side 2 of each plate 1 using the following welding parameters: tool rotation=190 rpm, welding speed=150 mm/min and vertical force (i.e. down the length of the tool)=61 kN. To avoid material overheating during the welding process, on completion of each weld run (each bead-on-plate weld) the plate was allowed to cool to room temperature before the next weld run was commenced. FIG. 1b shows schematically a portion of the plate 1 including the side 2 of the plate after welding. FIG. 1c shows the plate in cross-section (the section being taken across plane C-C, which plane has a normal axis that is parallel to the LT direction). As can be seen in FIG. 1c, the successive weld runs 3 were performed such that there was a 10 mm separation ws between neighbouring weld centre-lines $w_1$, $w_2$, $w_3$ ... $w_{10}$. The tool achieved a 12 mm weld penetration. Thus, as can be seen in FIG. 1b, a welded region having a width ww of at least 100 mm (in the ST-direction) and a depth wd of about 12 mm deep (in the L-direction) was formed. As such, the parent material structure (having a coarse grain structure) was changed into a typical friction stir weld structure (a fine grain structure).

After the friction stir welding step was completed, the top surfaces of the welds were skimmed, thereby removing about 1.0-1.5 mm of material from the sides 2 to be welded together, thereby forming a smooth flat surface. Both plates were also machined to trim their thickness (in the ST direction) so that the surface of the side 2 of the plate 1 to be welded was 100 mm thick, the entire surface on that side 2 thus having been affected by the friction stir welding process (thereby providing a fine grain structure).

The two plates 1 were assembled in a vacuum chamber with the use of tack welds to form a 100 mm thick (in the ST direction) butt joint running in the LT direction. Run-in and run-out plates were positioned either side of the butt joint and the joint was backed by a backing plate. Electron beam welding was then performed horizontally in the LT direction with a vertical beam and using the following welding parameters: accelerating voltage=60 kV, beam current=450 mA, focus current=610 mA, welding speed=240 mm/min, vacuum in the chamber=$2 \times 10^{-4}$ torr, beam oscillation=1.2 mm diameter circle and an oscillation frequency=800 Hz.

Figure 2B:
Figure 2C:
Figure 2D:
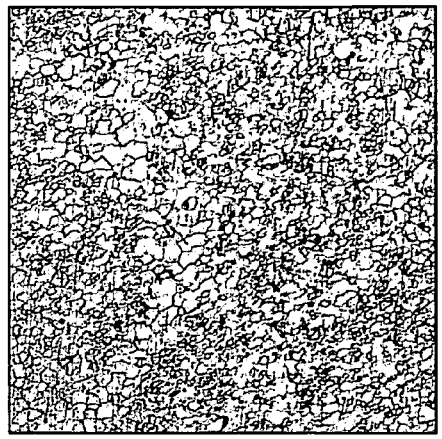
Figure 2E:
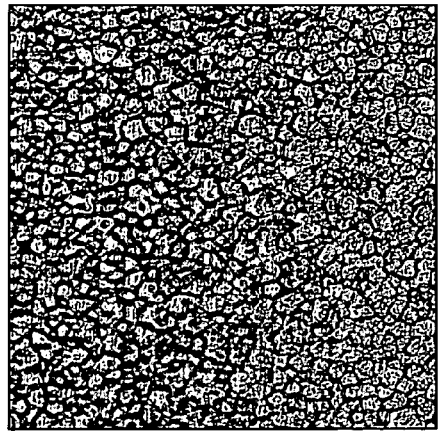
Figure 2F:
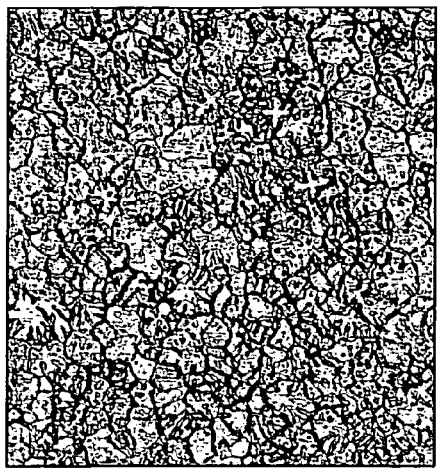
Figure 2G:
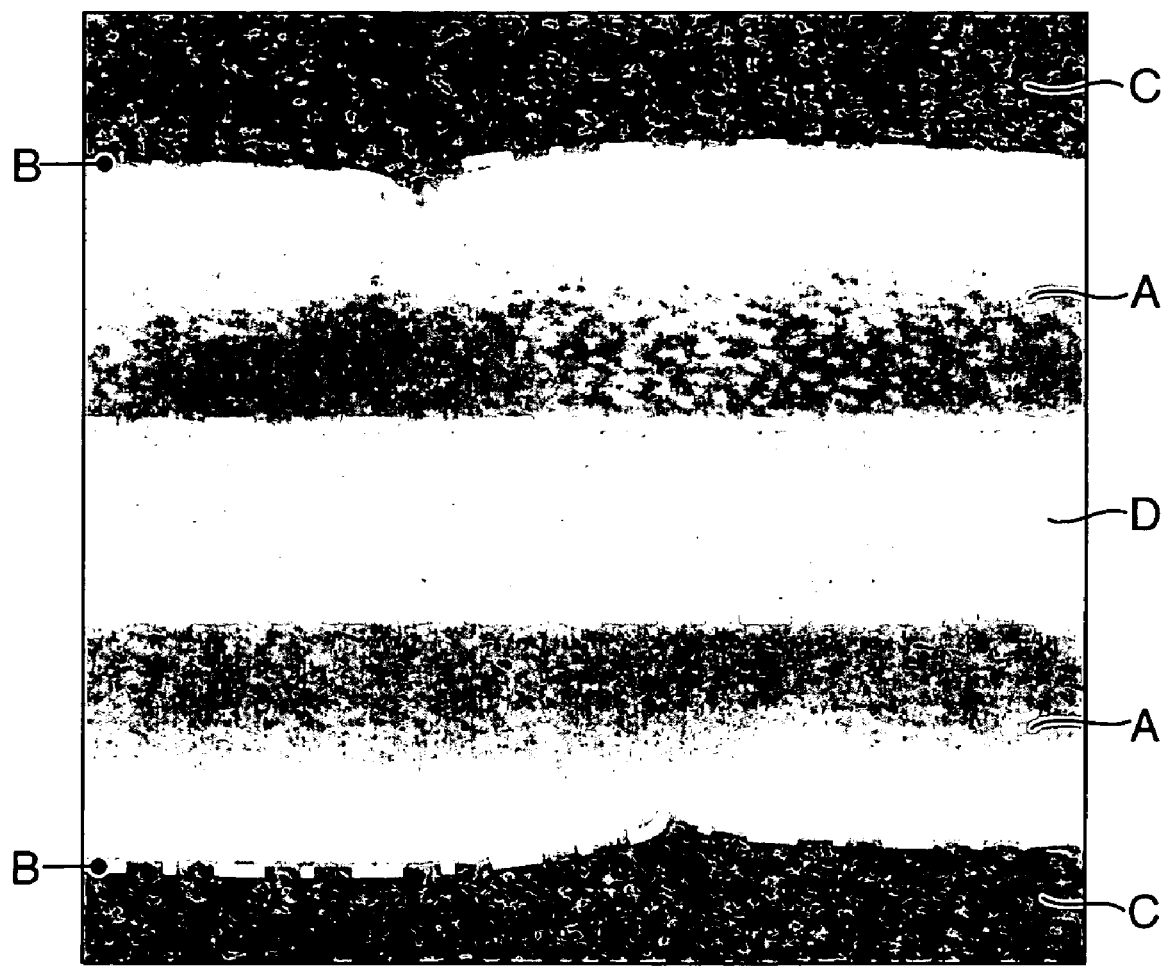
FIG. 2g shows a portion of FIG. 2a illustrating the different regions of the weld.

The welded joint so produced is shown in FIGS. 2a to 2g. FIG. 2a shows a cross-section of the weld joint, the section being taken in the plane parallel to the ST and L directions and having its normal axis parallel to the LT direction. FIG. 2g shows a portion of FIG. 2a (rotated by 90 degrees) illustrating the various regions A, B, C, D of the weld. As can be seen in FIGS. 2a and 2g, the electron beam weld (region D) is formed between the two plates 1 and is sandwiched between the friction stir welding regions A on each respective plate 1. Beyond the friction stir welding region A is the parent alloy of the plate 1, represented by region C. The interface between regions A and C is represented by region B. Region B, being relatively narrow compared to regions A and C, is represented in FIG. 2g by the dotted white line that divides regions A and C.

The average width of the electron beam weld is about 5 mm. The average width of regions A-D-A combined is about 20 mm. The width of the heat affected zone of the electron beam weld is very approximately 30 mm.

Figure 3:
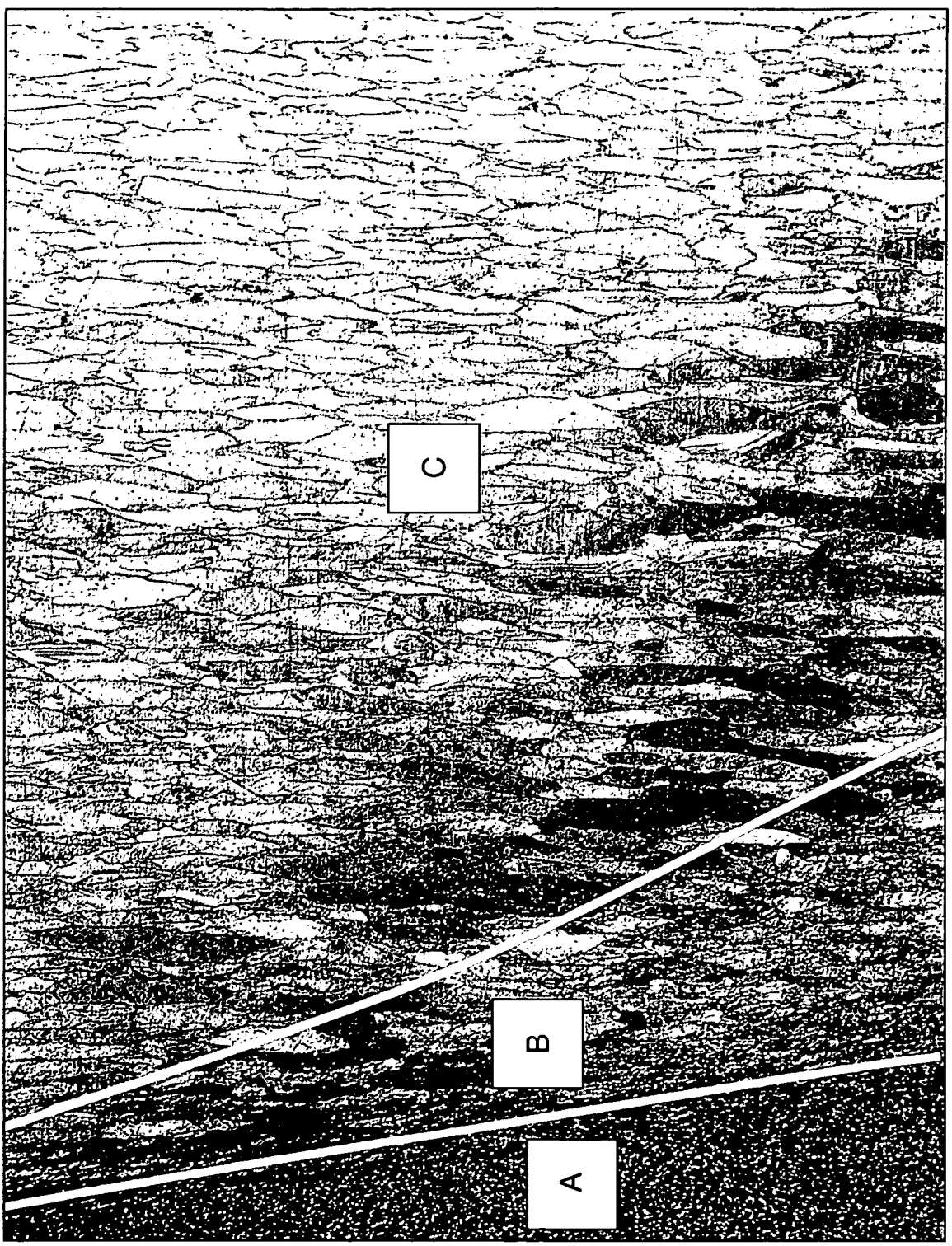
FIG. 3 shows a magnified portion of an alloy that has been friction stir welded.

FIG. 2b shows a region of FIG. 2a magnified to show the grain structure at the interface (region B) between the friction stir weld region A and the parent alloy (region C). The left-hand side area of FIG. 2b shows the shearing of the alloy and shows that the grains become progressively smaller as one moves from region C (the right of FIG. 2b) to region A (the left of FIG. 2b). FIG. 3 shows a separate sample in cross-section illustrating more clearly the size and orientation of the grains in regions A, B, and C. As can more clearly be seen in FIG. 3, the grains in region A (the region that has been friction stir welded) are much finer than the coarse grains in region C (of the unwelded parent alloy). It will be observed that no cracks are apparent in either FIG. 2b or 3. The difference between the grain size number, $G_A$, of the alloy in region A and the grain size number, $G_C$, in region C is greater than 3.

FIG. 2c shows a region of FIG. 2a magnified (at the same magnification as FIG. 2b) to show the grain structure at the interface (region B) between two neighbouring friction stir welds and the parent alloy (region C). Again, whilst the grains have been sheared, the transition between the parent alloy (to the right in FIG. 2c) and the adjacent friction stir welded regions (to the left in FIG. 2c) is gradual. It will again be observed that no cracks are present.

FIG. 2d shows a region of FIG. 2a magnified (at about 2.5 times the magnification of FIGS. 2b and 2c) to show the grain structure in the friction stir welded region A. The grains in region A are relatively fine compared to the grains in region C (taking into account the difference in magnification between FIGS. 2b and 2c on the one hand and FIG. 2d on the other). Again, there is no evidence of any cracking or faults.

FIG. 2e shows a region of FIG. 2a magnified (at the same magnification of FIG. 2d) to show the grain structure at the interface between the friction stir weld region A (the right hand side of FIG. 2e) and the electron beam welded region D (the left hand side of FIG. 2e). The grains in this interface region are relatively fine. The interface between the two regions is gradual and therefore difficult to identify, especially as the grain size and orientation in each region are very similar. FIG. 2e shows however that the interface between the electron beam weld and the friction stir weld region is of very high quality. Yet again, there is no evidence of any cracking or faults.

FIG. 2f shows a region of FIG. 2a magnified (at the same magnification of FIGS. 2d and 2e) to show the grain structure within the electron beam welded region D. Again, the grains in this interface region are relatively fine and are of a similar size to, although very slightly larger than, the grains in the friction stir welded region A. Whilst none would be expected in any case, it will be seen that no cracks are evident in this region D.

FIGS. 2a to 2g illustrate that the present embodiment may be utilised to produce high quality welds, without liquation cracking, on alloys where it has generally been considered difficult, if not impossible, to form welds on joints having any substantial thickness. The limit on the thickness of the joint of the present invention will probably be determined by the limit of the thickness to which the fusion welding (in this embodiment, electron beam welding) can be effected satisfactorily.

Figure 4:
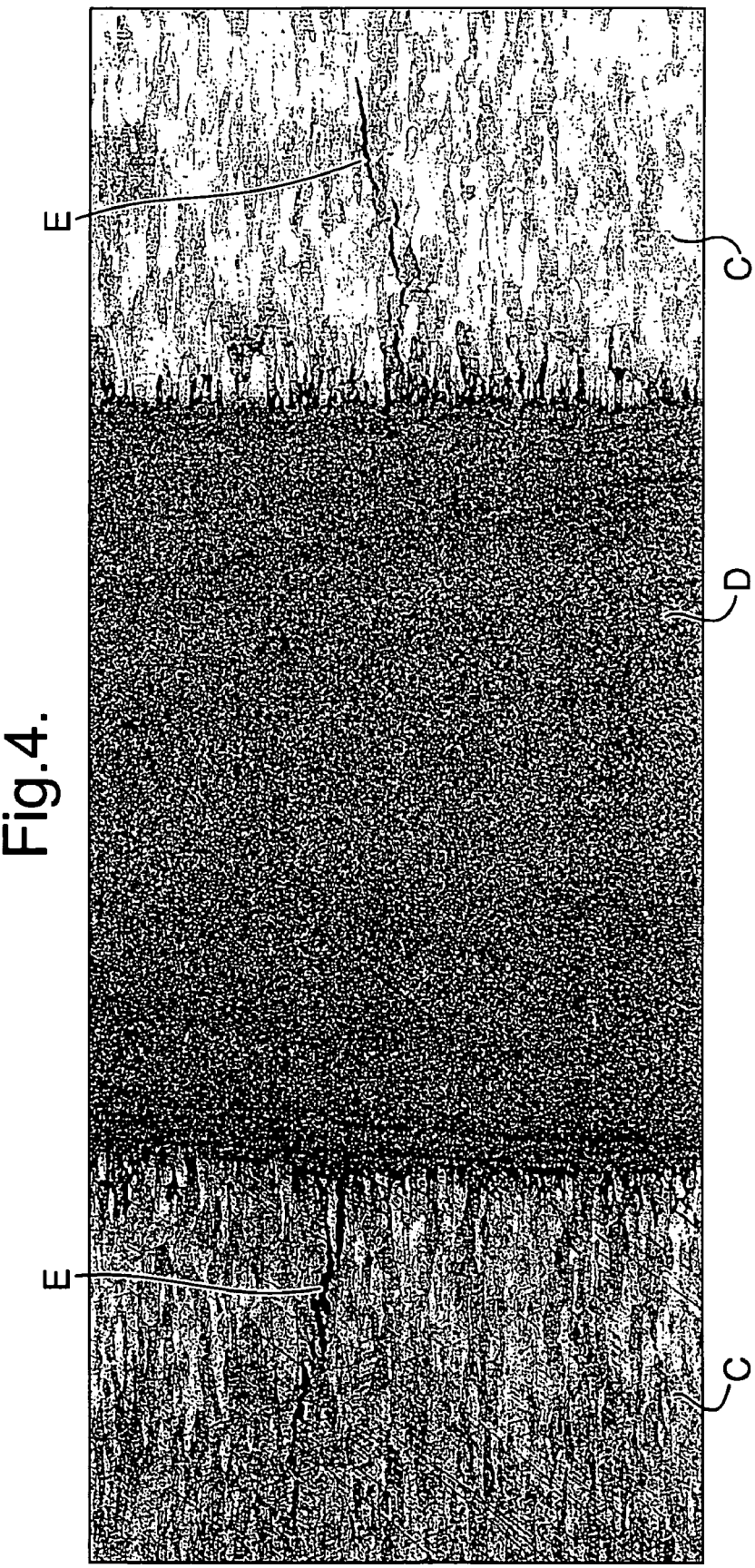
FIG. 4 shows a magnified portion of an alloy that has been electron beam welded in accordance with a prior art method.

By way of comparison, FIG. 4 shows a cross-section of a joint made between two plates of the same alloy as used in the first embodiment, without the step of friction stir welding. The electron beam weld is shown as region D and is sandwiched directly between two regions C of parent alloy (of the two plates, respectively). As can be seen in FIG. 4, cracks E have formed as a result of the electron beam welding.

Figure 5:
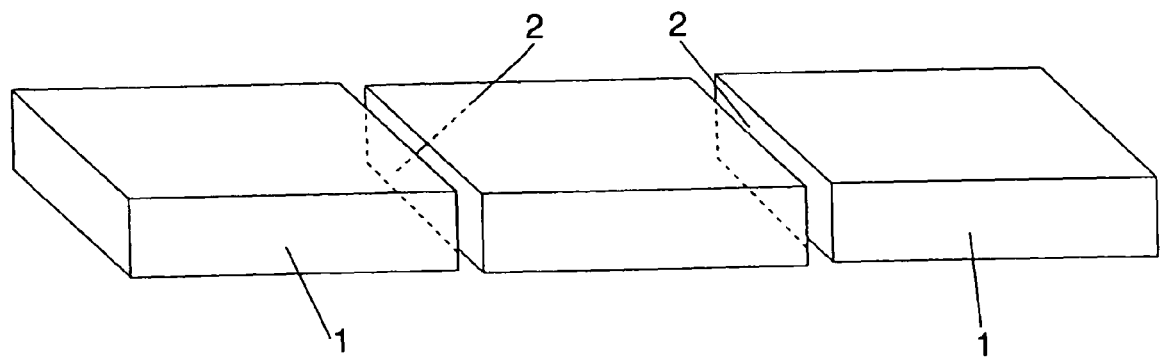
FIG. 5 illustrates schematically the welding together of three aluminium billets according to a second embodiment of the invention.

FIG. 5 illustrates schematically a second embodiment of the present invention. Three billets 1 of aluminium alloy suitable for forming an aircraft component are welded together end to end to form an elongate block of aluminium alloy. Each billet measures 5 m×2 m×200 mm. Adjacent end faces 2 of the billets 1 are welded together by means of a method similar to that described above in relation to the first embodiment of the invention. Almost the entire surface of each end face 2, of each billet to be welded to an adjacent billet, is friction stir welded to a depth of 25 mm. Then the end faces so welded are skimmed by means of a milling machine that removes about 1 mm of material from the end face. The top and bottom faces, abutting the end face, are also skimmed in preparation for the next step. Adjacent billets are then welded together by means of an electron beam welding process, thereby forming a solid block of alloy measuring about 15 m×2 m×200 m. A spar for an aircraft wing is then machined from the single solid block. The spar is about 14 m long.

Figure 6:
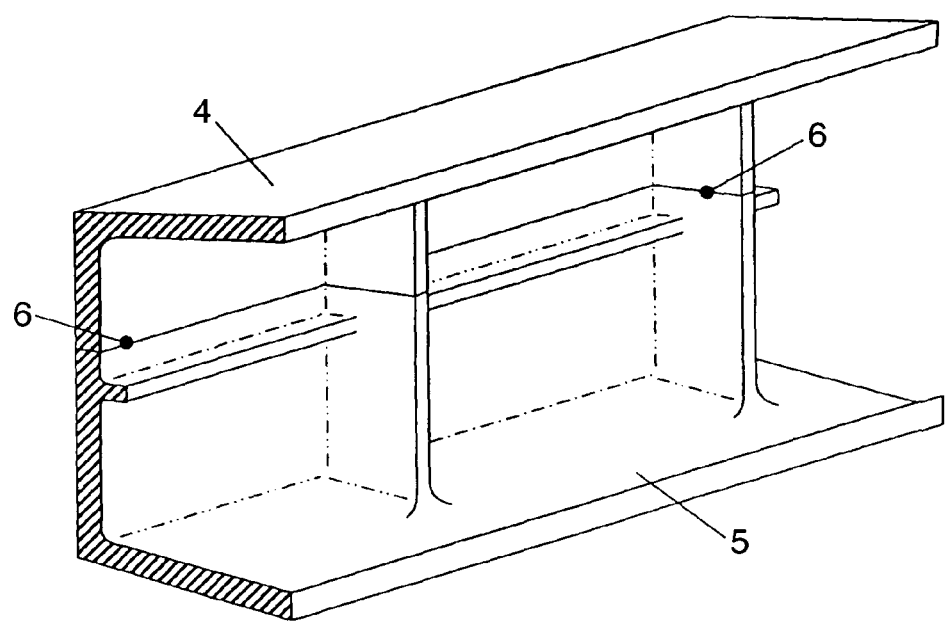
FIG. 6 shows a wing spar machined from two billets in accordance with a third embodiment.

According to a third embodiment, shown in FIG. 6, two billets of different alloy material are welded together by means of the method of the second embodiment described above, although only two billets are joined in this embodiment. A first billet of 2000 series alloy measuring 100 mm×1 m×10 m is joined to a second billet of 7000 series alloy also measuring 100 mm×1 m×10 m, thereby forming a block of material measuring 100 mm×2 m×10 m. The resulting block is then machined into a spar, such as that shown in FIG. 6. The spar has an upper portion 4 made of 7000 series alloy providing a high strength region, where strength is important, and a lower portion 5 made of 2000 series alloy providing a region where a high damage tolerance is more important than strength. The weld line between the two portions 4, 5 is labeled with reference numeral 6 in FIG. 6

It will, of course, be appreciated that various modifications may be made to the above-described embodiments without departing from the spirit of the present invention. For example, components (such as for example a wing rib or a section of the wing skin) other than a wing spar could be machined from the billets of aluminium once welded together. Rather than electron beam welding, other fusion welding processes could be employed, such as laser welding. The invention has application in relation to alloys other than Aluminium alloys including for example Magnesium alloys. Other modifications will, of course, be apparent to the person skilled in the art.

The invention claimed is:

1. A method of welding together two work-pieces, the method including the following steps:

providing two metal work-pieces, each work-piece having a face, friction stir welding a region on each work-piece face, wherein the friction stir welded region extends only part way into the work-piece from an exterior surface of each work-piece, and each friction stir welded region having a grain structure that is finer than the grain structure of the work-piece outside the friction stir welded region, machining the friction stir welded region of each work-piece to produce a prepared surface on one work-piece that can be fusion welded to a corresponding surface on the other work-piece, aligning the friction stir welded regions of the respective work-pieces so that a friction stir welded region abuts another friction stir welded region, and fusion welding the respective prepared surfaces of the two work-pieces together such that a fusion welded region of the work-pieces that melts during the fusion welding process is at least partially encompassed within the friction stir welded regions of the work-pieces, the fusion welding process thereby joining the work-pieces.

2. A method of welding together two metal work-pieces, the method including the following steps:

providing two metal work-pieces, each work-piece having a face preparing a portion of each work-piece, the preparation including friction stir welding a region on each work-piece face, the friction stir welding resulting in a friction stir welded region of each work-piece extending from the exterior surface only part way into the respective work-piece, and the friction welded region of each work-piece having a grain structure that is finer than the grain structure of the work-piece outside that region, aligning the two work-pieces so that the friction welded regions abut, and welding together the work-pieces by means of a fusion welding process that joins the respective prepared portions of the two work-pieces, wherein the friction stir welded region of each work-piece extends into the work-piece to a depth that exceeds the depth of material that is caused to melt during the fusion welding process such that a fusion welded region of the work-pieces that melts during the fusion welding process is at least partially encompassed within the friction stir welded regions of the work-pieces.

3. A method according to claim 1, wherein the work-pieces, when joined, form at least part of a block of metal, the method further including the step of manufacturing an aircraft component, wherein the aircraft component is machined from the block of metal.

4. A method according to claim 2, wherein the work-pieces, when welded together, form at least part of a block of metal, the method further including the step of manufacturing an aircraft component, wherein the aircraft component is machined from the block of metal.

5. A method according to claim 1, wherein the method further includes a step of making an aircraft component from the work-pieces when welded together, and a step of manufacturing an aircraft including the aircraft component.

6. A method according to claim 2, wherein the method further includes a step of making an aircraft component from the work-pieces when welded together, and a step of manufacturing an aircraft including the aircraft component.

7. A method of manufacturing an aircraft component, comprising the steps of (a) providing two or more metal work-pieces, each work-piece having a least cross-sectional dimension of 50 mm or greater;

(b) friction stir welding at least one region of each of said two or more work-pieces thereby producing a friction stir welded region extending from the exterior surface of the work-piece into the work-piece by a first distance greater than 10 mm, the friction stir welded region having a grain structure that is finer than the grain structure of the work-piece outside that region, (c) skimming the friction stir welded region of each of said two or more work-pieces to produce a substantially flat surface, (d) arranging said two or more work-pieces so that the substantially flat surface of each of said two or more work-pieces resulting from step (c) abuts the substantially flat surface of another of said two or more work-pieces resulting from step (c), (e) fusion welding the abutting substantially flat surfaces, thereby joining the work-pieces together to form a block of metal, the fusion welding causing material in the friction stir welded region of each work-piece to melt to a second distance extending into the work-piece, the second distance being less than the first distance such that a fusion welding region of the work-pieces that melts during fusion welding is encompassed within the friction stir welded regions of the work-pieces, and (f) after step (e), machining metal away from the block of metal to form an aircraft component.

8. A method of joining two metal work-pieces, the method comprising:

providing two metal work-pieces, each work-piece presenting at least one face defining a plane;

preparing the work-pieces by applying a friction stir welding process on the at least one face of each work-piece, the friction stir welding process defining a friction stir welded region extending a first distance into the work-piece from the plane of the at least one face, the friction stir welded region having a grain structure that is finer than the grain structure of the work-piece outside the friction stir welded region;

arranging the work-pieces so that the at least one face of one work-piece abuts the at least one face of the other work-piece at a butt joint; and then welding the two work-pieces together at the butt joint with a fusion welding process wherein a portion of the friction stir welded region of each work-piece is melted, thereby defining a melted region extending into each work-piece a second distance from the plane of the at least one face of each work-piece, and wherein the first distance is greater than the second distance such that the melted region is encompassed within the friction stir welded regions of the work-pieces and so that a remaining portion of the friction stir welded region of each work-piece is sandwiched between the melted region and the portion of the work-piece outside the friction stir welded region.

9. A method according to claim 8, wherein the friction stir welding process is conducted such that the first distance is at least 10 mm.

10. A method according to claim 8, wherein a least dimension of the face of each work-piece is 50 mm or greater.

11. A method according to claim 8, further comprising machining the face of each work-piece after the friction stir welding process.

12. A method according to claim 8, wherein the fusion welding process is performed by means of an electron beam welding process.

13. A method according to claim 8, wherein the work-pieces are made from aluminum alloys.

14. A method according to claim 8, wherein one of the work-pieces is made from a first metal alloy, and the other of the work-pieces is made from a second metal alloy different from the first metal alloy.

15. A method according to claim 8, wherein the two work-pieces, when welded together, form at least part of a block of metal, the method further comprising machining an aircraft component from the block of metal.

16. A method according to claim 15, further comprising manufacturing an aircraft including the aircraft component.

* * * * *